United States Patent
Chakraborty et al.

(10) Patent No.: US 10,215,578 B2
(45) Date of Patent: Feb. 26, 2019

(54) SYSTEM, METHOD AND COMPUTER PROGRAM PRODUCT FOR PATH COMPUTING BASED ON UNPLEASANT DATA

(71) Applicant: International Business Machines Corporation, Armonk, NY (US)

(72) Inventors: Supriyo Chakraborty, White Plains, NY (US); Catherine Helen Crawford, White Plains, NY (US); Ramya Raghavendra, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

(21) Appl. No.: 15/249,721

(22) Filed: Aug. 29, 2016

(65) Prior Publication Data

US 2018/0058869 A1    Mar. 1, 2018

(51) Int. Cl.
  *G01C 21/34*  (2006.01)
  *G06F 17/30*  (2006.01)
  *G06Q 10/04*  (2012.01)

(52) U.S. Cl.
  CPC ..... *G01C 21/3484* (2013.01); *G01C 21/3453* (2013.01); *G01C 21/3461* (2013.01); *G06F 17/30241* (2013.01); *G06F 17/30598* (2013.01); *G06F 17/30958* (2013.01); *G06Q 10/047* (2013.01)

(58) Field of Classification Search
  CPC ............ G01C 21/3484; G01C 21/3461; G01C 21/3453; G06F 17/30241; G06F 17/30598; G06F 17/30958; G06Q 10/047
  See application file for complete search history.

(56) References Cited

U.S. PATENT DOCUMENTS

| | | | | |
|---|---|---|---|---|
| 7,398,257 | B2* | 7/2008 | Kaji | G05B 13/0265 700/173 |
| 8,249,810 | B2* | 8/2012 | Jones | G01C 21/3446 701/400 |
| 8,515,673 | B2* | 8/2013 | Trinko | G01C 21/3697 701/532 |
| 8,965,833 | B2* | 2/2015 | Waldock | G06F 17/11 706/52 |
| 9,086,292 | B2* | 7/2015 | Horvitz | G01C 21/3697 |
| 2006/0247852 | A1* | 11/2006 | Kortge | G01C 21/3461 701/533 |

(Continued)

OTHER PUBLICATIONS

Blue et al., "Real-Time Multiple-Objective Path Search for In-Vehicle Route Guidance Systems", Transportation Research Record: Journal of the Transportation Research Board 1588, 1997, pp. 10-17. (Year: 1997).*

(Continued)

*Primary Examiner* — Todd M Melton
(74) *Attorney, Agent, or Firm* — Jennifer R. Davis, Esq.; McGinn IP Law Group, PLLC

(57) ABSTRACT

A path computing method, system, and computer program product, include extracting unpleasant data from a database to create a multi-variate spatio-temporal density function, collecting a tolerance level of a user, and computing a path for the user based on the tolerance level and the density function.

17 Claims, 4 Drawing Sheets

(56) References Cited

U.S. PATENT DOCUMENTS

| | | | |
|---|---|---|---|
| 2008/0033644 A1* | 2/2008 | Bannon | G01C 21/3461 701/414 |
| 2008/0162034 A1* | 7/2008 | Breen | G01C 21/26 701/533 |
| 2009/0210142 A1* | 8/2009 | Couckuyt | G01C 21/3461 701/532 |
| 2010/0036599 A1* | 2/2010 | Froeberg | G01C 21/3461 701/532 |
| 2017/0191847 A1* | 7/2017 | Chintakindi | G01C 21/3667 |

OTHER PUBLICATIONS

Rilett et al., "Incorporating Uncertainty and Multiple Objectives in Real-Time Route Selection", Journal of Transportation Engineering 127(6), Nov. 2001, pp. 531-539. (Year: 2001).*

Dongjoo et al., "A Class of Multicriteria Shortest Path Problems for Real-Time In-Vehicle Routing", Canadian Journal of Civil Engineering, Sep. 2007, pp. 1096-1109. (Year: 2007).*

Mel, et al. "The NIST Definition of Cloud Computing". Recommendations of the National Institute of Standards and Technology. Nov. 16, 2015.

* cited by examiner

SYSTEM, METHOD AND COMPUTER PROGRAM PRODUCT FOR PATH COMPUTING BASED ON UNPLEASANT DATA

BACKGROUND

The present invention relates generally to a path computing method, and more particularly, but not by way of limitation, to a system, method, and computer program product for computing a path with varying intents based on unpleasant data.

Conventionally, route generation is based on minimizing distance and time from a starting point to a finish point. Route generation conventionally considers fuel mileage optimization in vehicles, so called "happy routes" on a bicycle, crowd sourcing to create a scenic route, etc.

Also, conventional route generation techniques consider indicating areas of crime to allow a user to selectively decide their route. Such techniques are typically not useful when route planning in which the goals and constraints are not absolute.

However, needs in the art include the needs to consider user preferences for tolerating a proximity to an unpleasant incident versus time and distance to a destination.

SUMMARY

In an exemplary embodiment, the present invention can provide a computer-implemented path computing method, the method including extracting unpleasant data from a database to create a multi-variate spatio-temporal density function, collecting a tolerance level of a user, and computing a path for the user based on the tolerance level and the density function.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
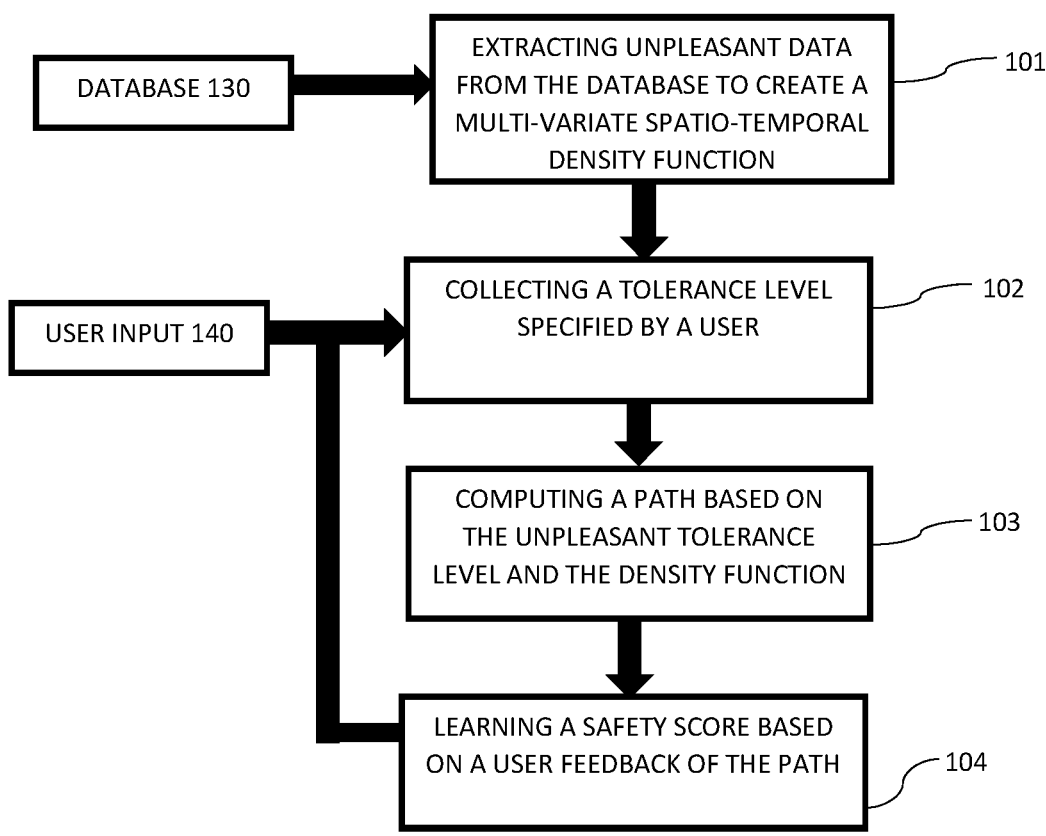
FIG. 1 exemplarily shows a high-level flow chart for a path computing method 100.

The invention will now be described with reference to FIG. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the path computing method 100 includes various steps to compute a path for a user based on a user's tolerance to unpleasant incidents and a density function representing a location of the unpleasant incidents. As shown in at least FIG. 2, one or more computers of a computer system 12 according to an embodiment of the present invention can include a memory 28 having instructions stored in a storage system to perform the steps of FIG. 1.

Thus, the path computing method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 2-4) may be implemented in a cloud environment 50 (see e.g., FIG. 3), it is nonetheless understood that the present invention can be implemented outside of the cloud environment.

In step 101, unpleasant data is extracted from a database 130 to create a multi-variate spatio-temporal density function representing the unpleasant data on a geolocational map. Unpleasant data may comprise data about incident types such as assault and murder rates, larceny and theft rates, smells emanating from building, physical conditions such as narrow roads, large hills or mountain paths, man-made structures such as tunnels, bridges, prisons, etc., lighting conditions if traveling during nighttime, etc. That is, unpleasant data may comprise information about incidents associated with a location that a user may selectively wish to avoid when computing a path to follow using a Global Position System (GPS).

In step 101, the unpleasant data is semantically combined from multiple data sources to construct a rich incident repository (e.g., the database 130). For example, government-provided crime databases, social networks, crowd sourcing data, a city planning map, etc. can be combined to form the database 130 to extract unpleasant data therefrom. In step 101, unpleasant data is extracted from an "incident" map of a database 130 that includes crime, suspicious activity, harassment incidents, etc. associated with geotags from a plurality of resources based on the user location.

It is noted that the unpleasant data includes varying levels of information about incidents such that the incidents have varying degrees of unpleasantness to users. Incidents are ephemeral and have non-localized impact in space. Each incident includes an unpleasantness associated with the incident (e.g., how much the user does not want to be exposed to the incident) which can be expressed on a scale, where the interpretation can be learned per user. The scale can be designed to handle cases where an incident is inconsequential to a user (e.g., as described later). Examples might include crime, smell, sound etc.

A multi-variate spatio-temporal density function is created in step 101 representing the unpleasant data based on the incident and location of the incident. The density function may be created by running k-means and finding centroids based on activity (e.g., of the incidents) to obtain a geolocation of the centroids. The k-means can be weighted based on the activity (e.g. delivery trucks may weight car theft, larceny and assault very high while pedestrians rate assault very high or this can be learned as to the behavior of what is safe/not safe to weight events). Around each centroid, a decay function is created with decay rates that can be weighted for types of incident densities, time of day, and learned personal preferences. The decay functions values created from various centroids are additive in value, therefore creating an overall density function for all incidents for given geographic areas.

In other words, in step 101, the density function is created using k-means clustering to determine incident clusters from the unpleasant data and assuming standard decay functions such as Gaussian kernel, exponential decay, etc. Also, the density function may be improved by learning through a sequence of binary spatio-temporal testing.

It is noted that any clustering approach such as k-means, mixture learning, hierarchical clustering, or some other form of learning algorithms could be used to determine the crime clusters. Once a cluster is computed, either a single point (e.g., the cluster centroid) or a set of points could be used to represent the cluster spatially. The decay function is then computed w.r.t to these chosen point(s).

In step 102, a tolerance level is collected from a user input 140. The tolerance level may comprise a tolerance of the user to a specific type of incident. In other words, the tolerance level indicates a proximity to a particular type of incident that the user finds acceptable without exceeding an unpleasantness threshold. For example, the user can specify different tolerances for different types of incidents. That is, violent crimes may be weighted heavier than petty theft, larceny, stolen vehicles, smells emanating from a factory, which may not affect certain people, whereas physical conditions of user may render certain commutes (e.g., narrow roads, sunrise/sunset affecting vision, etc.), etc. unpleasant.

In step 103, a path (e.g., a route from a first location to a second location) is computed based on the tolerance level of the user and the density function. The path may be computed based on a constrained optimization problem over a graph where locations are nodes and the locations are connected using streets as edges. The association between the tolerance level and the density function is to compute paths such that on each edge of the path of the unpleasant data is less than the tolerance level, the sum of the edge weights is minimized, and a total time for the path is less than a user time constraint.

In step 103, the path is computed by weighting edges based on geolocation with the cumulative "risk" function from all centroids and decays. In step 103, the user is given a variety of path (e.g., a plurality of routes that the user may decide from to take to the destination) avoiding areas that are within a factor of probability of incident occurrences using the overall cumulative "risk" function. The variety in the path generation can be used by also prescribing a range of acceptance in the risk function.

That is, the path is computed based on information about the likelihood of unpleasant incidents and the distance or likely time for the paths.

In step 104, a safety score is learned based on a user feedback of the path (e.g., a manual feedback input by the user). For example, if the user selects a path, which is not close (e.g., farther from the incident than a predetermined amount) to an incident, the tolerance level can be updated based on the safety score indicating that the user would like to be further away from the incident. Also, the user can send data on safe/unsafe feelings along route to update the tolerance level and/or dynamically compute a new path to avoid the unpleasantness. Also, the safety score can be learned to dynamically adjust route learning by creating larger safety zones between the path and the unpleasant data, a current conditions such as time of day or other factors, feedback from the user, etc. Thus, the user's behavior is learned for further path planning on path selection and ultimate path taken (with adjustments).

In other words, a feedback loop is created to dynamically compute a path for the user based on actions taken by the user. That is, behavioral learning may provide optimized paths and dynamically adjust paths when the user makes a wrong turn or embarks on a new path.

In some embodiments, given all the user inputs, an aggregate probability density function over incidents can be generated for the region of interest by using k-means to develop centroids for crime clusters, using centroid distances and weighting for various incidents and Time of Day (ToD) preferences along with a user's "avoidance zone(s)" to develop a decay function from a centroid where the decay functions are additive for a cumulative effect such that $U[lat,long]=[0,1]$ where U is the probability density at that location. The edges in graph are weighted to avoid $U[lat,long]>t$ where "t" is user tolerance to unpleasantness to provide multiple paths with an unpleasantness indicator (t) so as to generate further feedback on user preferences. The actual path chosen is monitored and the user is queried as to why a route was not followed and such data is used it as feedback for future route computations.

Thereby, the method 100 can leverage a geospatial database 140 for incident reports, which are amenable to map, and path building coupled with paths that a user chooses over others to learn their comfort zone behavior such that paths may be customized with this information per user, giving the best experience possible. The personalized path may be computed based on known data, constraints, varying user preferences, and behavior.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Figure 2:
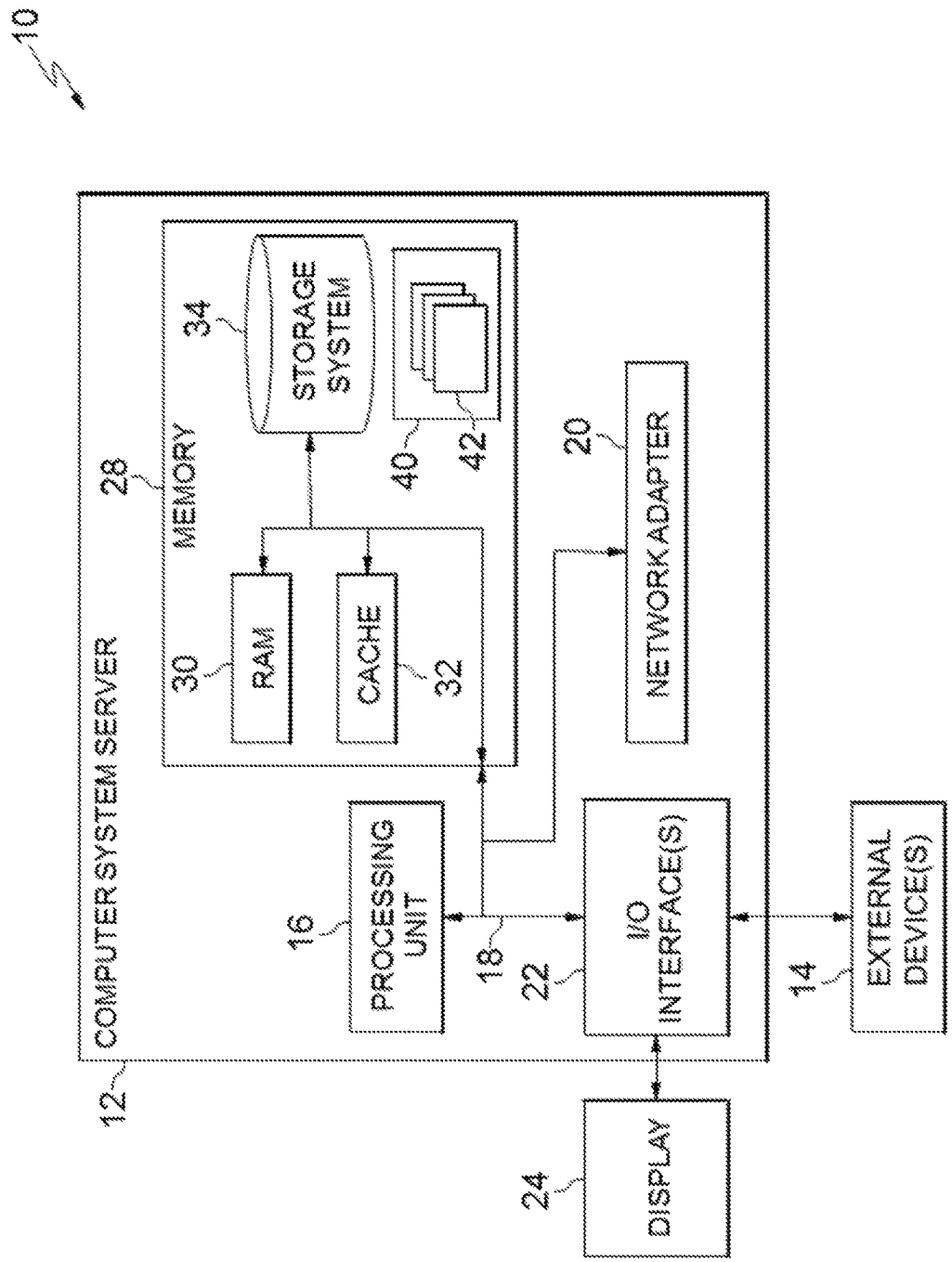
FIG. 2 depicts a cloud-computing node 10 according to an embodiment of the present invention.

Referring now to FIG. 2, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
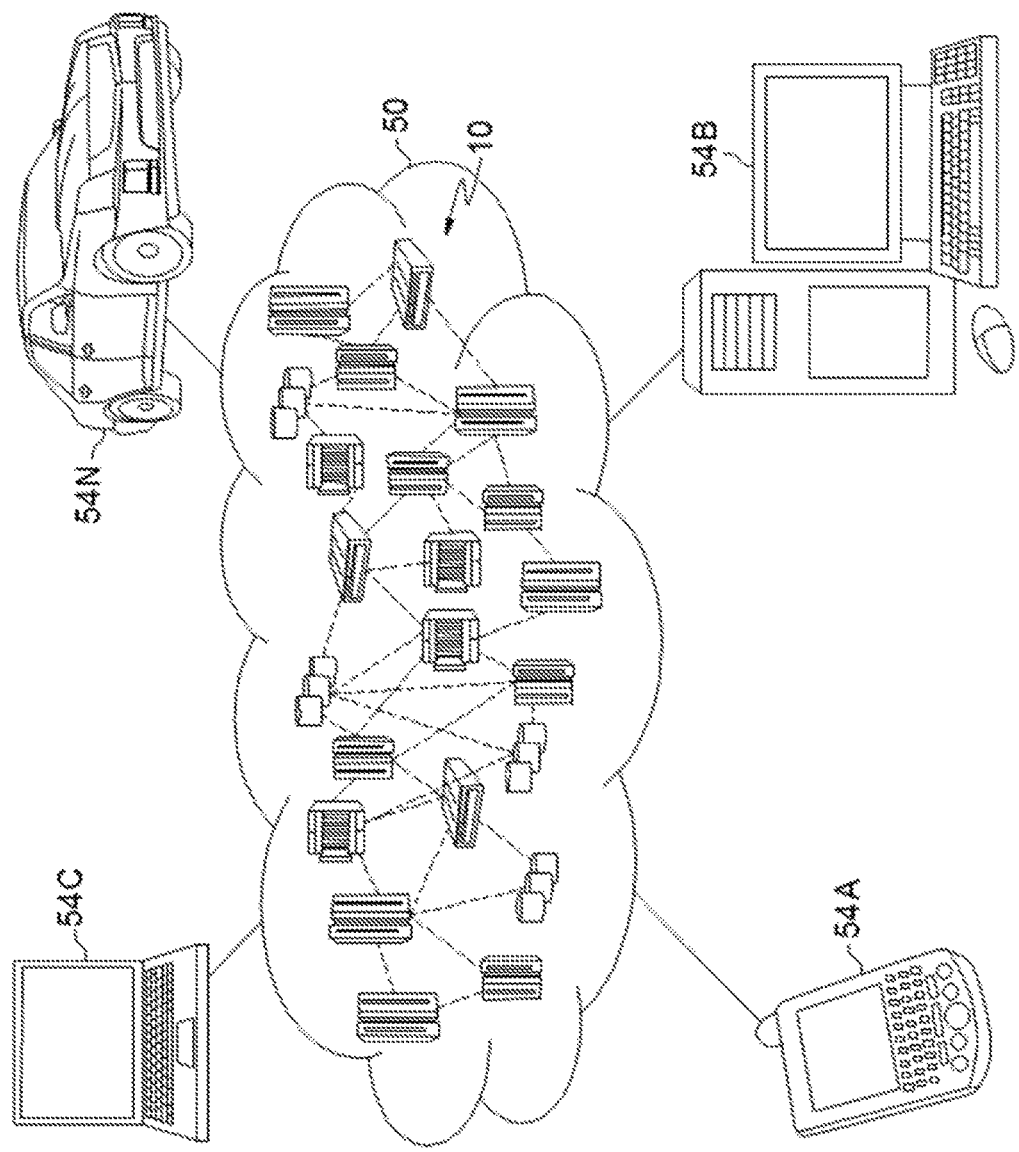
FIG. 3 depicts a cloud-computing environment 50 according to an embodiment of the present invention.

Referring now to FIG. 3, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud-computing environment 50 can communicate with any type of computerized circuit over any type of network and/or network addressable connection (e.g., using a web browser).

Figure 4:
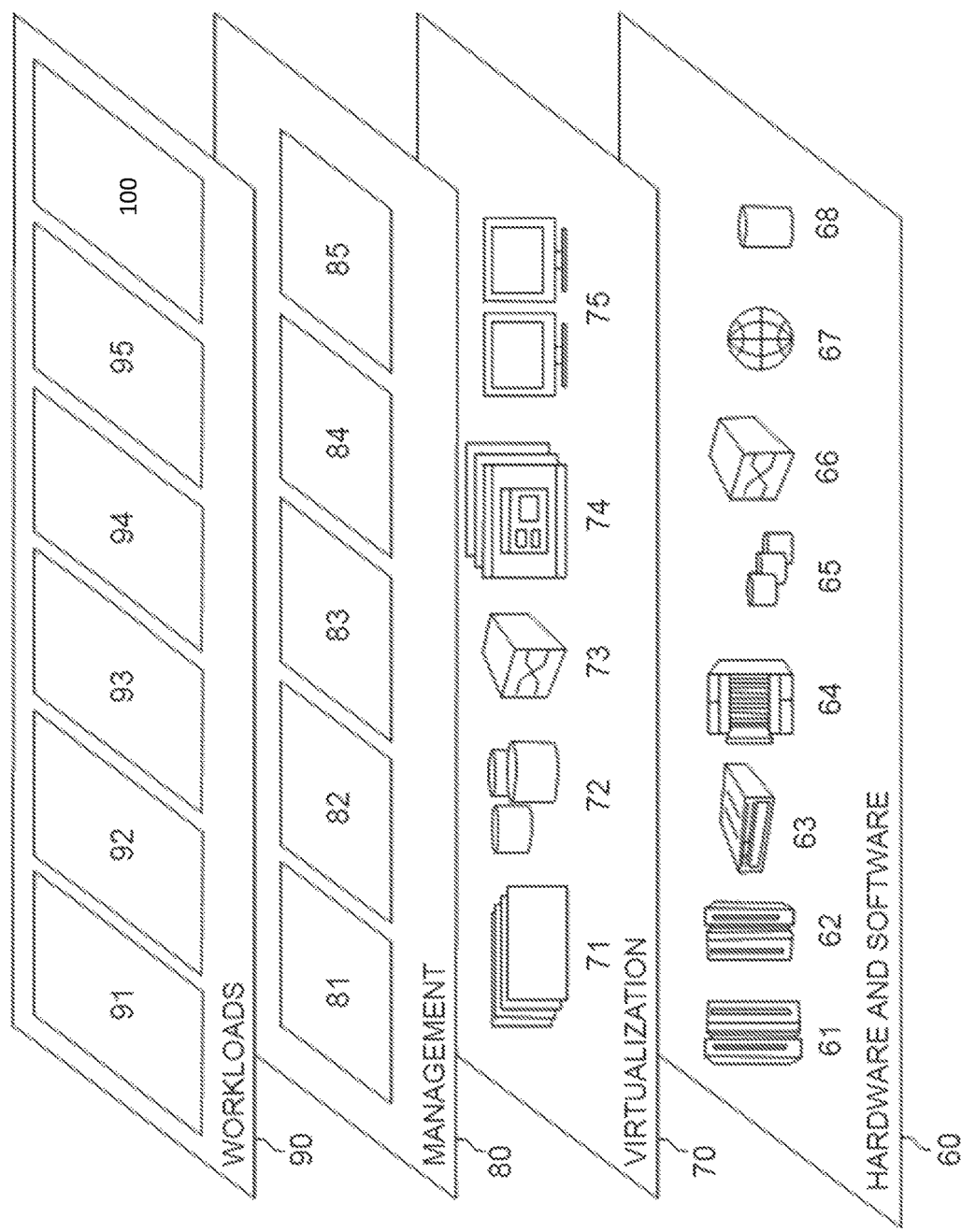
FIG. 4 depicts abstraction model layers according to an embodiment of the present invention.

Referring now to FIG. 4, an exemplary set of functional abstraction layers provided by cloud-computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the path computing method 100.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented path computing method, the method comprising:
   extracting unpleasant data from a database to create a plurality of multi-variate spatio-temporal density functions;
   collecting a tolerance level of a user; and
   computing a path for the user based on the tolerance level and the plurality of density functions,
   wherein, around a geolocation of centroids defining an incident in the unpleasant data for each of the plurality of density functions, a decay function is created with decay rates that are weighted based on a type of the incident and a time of day associated with the incident, the decay being in relation to a distance from a location having a highest value risk of the unpleasant data,
   wherein a geofence is created around the centroids,
   wherein the computing determines a path between the geofences that does not overlap with the geofences to maximize a distance to the incidents in the centroids,
   wherein the computing entirely avoids the incident in the unpleasant data and maximizes a distance between each of the geolocation of centroids of the plurality of density functions, and
   wherein the path is computed based on a constrained optimization problem over a graph where locations are nodes in the geofence and the locations are connected using streets as edges in which an association between the tolerance level and the plurality of density functions are used to compute the path such that:
      each edge of the geofence of the unpleasant data is less than the tolerance level;
      a sum of the edge weights is minimized; and
      a total time for the oath is less than a user time constraint.

2. The computer-implemented method of claim 1, wherein the unpleasant data comprises a relationship between a type of incident and a location of the type of the incident.

3. The computer-implemented method of claim 1, wherein the unpleasant data is semantically combined in the database from multiple data sources selected from a group consisting of:
   a government-provided crime database;
   a social network;
   crowd sourcing data; and
   a city planning map.

4. The computer-implemented method of claim 1, wherein the plurality of density functions are created by running k-means and finding the centroids based on a location associated with an incident in the unpleasant data to obtain the geolocation of the centroids.

5. The computer-implemented method of claim 4, wherein the k-means are weighted based on a predetermined weighting for each type of incident.

6. The computer-implemented method of claim 1, further comprising learning a safety score based on a user's safely tolerance while on the computed path and based on prior data about the tolerance level.

7. The computer-implemented method of claim 1, wherein a plurality of paths are computed by the computing, the method further comprising:
   learning a safety score to update the tolerance level of the user based on a path of the plurality of paths selected by the user.

8. The computer-implemented method of claim 1, embodied in a cloud-computing environment.

9. The computer-implemented method of claim 1, further comprises generating the path by weighting edges of the decay function based on the geolocation with a cumulative risk function from all centroids and decays such that a variety of routes are generated for avoiding areas that are within a factor of probability of incident occurrences using the overall cumulative risk function.

10. The computer-implemented method of claim 1, wherein the computing avoids an area that is within a factor of a probability of an incident occurrence greater than the tolerance level using the density functions.

11. A computer program product for path computing, the computer program product comprising a computer-readable storage medium having program instructions embodied therewith, the program instructions executable by a computer to cause the computer to perform:
   extracting unpleasant data from a database to create a plurality of multi-variate spatio-temporal density functions;
   collecting a tolerance level of a user; and
   computing a path for the user based on the tolerance level and the plurality of density functions,
   wherein, around a geolocation of centroids defining an incident in the unpleasant data for each of the plurality density functions, a decay function is created with decay rates that are weighted based on a type of the incident and a time of day associated with the incident, the decay being in relation to a distance from a location having a highest value risk of the unpleasant data,
   wherein a geofence is created around the centroids,
   wherein the computing determines a path between the geofences that does not overlap with the geofences to maximize a distance to the incidents in the centroids,
   wherein the computing entirely avoids the incident in the unpleasant data and maximizes a distance between each of the geolocation of centroids of the plurality of density functions, and
   wherein the path is computed based on a constrained optimization problem over a graph where locations are nodes in the geofence and the locations are connected using streets as edges in which an association between the tolerance level and the plurality of density functions are used to compute the path such that:
      each edge of the geofence of the unpleasant data is less than the tolerance level;
      a sum of the edge weights is minimized; and
      a total time for the path is less than a user time constraint.

12. The computer program product of claim 11, wherein the unpleasant data comprises a relationship between a type of incident and a location of the type of the incident.

13. The computer program product of claim 11, wherein the unpleasant data is semantically combined in the database from multiple data sources selected from a group consisting of:
   a government-provided crime database;
   a social network;
   crowd sourcing data; and
   a city planning map.

14. The computer program product of claim 11, wherein the plurality of density functions are created by running k-means and finding the centroids based on a location associated with an incident in the unpleasant data to obtain the geolocation of the centroids.

15. The computer program product of claim 14, wherein the k-means are weighted based on a predetermined weighting for each type of the incident.

16. A path computing system, said system comprising:
a processor; and
a memory, the memory storing instructions to cause the processor to:
extract unpleasant data from a database to create a plurality of multi-variate spatio-temporal density functions;
collect a tolerance level of a user; and
compute a path for the user based on the tolerance level and the plurality of density functions,
wherein, around a geolocation of centroids defining an incident in the unpleasant data for each of the plurality of density functions, a decay function is created with decay rates that are weighted based on a type of the incident and a time of day associated with the incident, the decay being in relation to a distance from a location having a highest value risk of the unpleasant data,
wherein a geofence is created around the centroids,
wherein the computing determines a path between the geofences that does not overlap with the geofences to maximize a distance to the incidents in the centroids,
wherein the computing entirely avoids the incident in the unpleasant data and maximizes a distance between each of the geolocation of centroids of the plurality of density functions, and
wherein the path is computed based on a constrained optimization problem over a graph where locations are nodes in the geofence and the locations are connected using streets as edges in which an association between the tolerance level and the plurality of density functions are used to compute the path such that:
each edge of the geofence of the unpleasant data is less than the tolerance level;
a sum of the edge weights is minimized; and
a total time for the path is less than a user time constraint.

17. The system of claim 16, embodied in a cloud-computing environment.

* * * * *